US008965868B2

(12) United States Patent
Blankstein et al.

(10) Patent No.: US 8,965,868 B2
(45) Date of Patent: Feb. 24, 2015

(54) METHOD AND SYSTEM FOR CONDUCTING PRE-EMPLOYMENT PROCESS

(75) Inventors: Lori E. Blankstein, New York, NY (US); Susan Stack, Millburn, NJ (US)

(73) Assignee: Barclays Capital Inc., New York, NY (US)

( * ) Notice: Subject to any disclaimer, the term of this patent is extended or adjusted under 35 U.S.C. 154(b) by 1132 days.

(21) Appl. No.: 11/600,010

(22) Filed: Nov. 15, 2006

(65) Prior Publication Data

US 2008/0114609 A1  May 15, 2008

(51) Int. Cl.
*G06F 17/30* (2006.01)
*G06Q 10/06* (2012.01)

(52) U.S. Cl.
CPC .................................... *G06Q 10/06* (2013.01)
USPC ......................................... 707/706; 707/732

(58) Field of Classification Search
USPC .................................................. 707/706, 732
See application file for complete search history.

(56) References Cited

U.S. PATENT DOCUMENTS

| 7,139,732 | B1* | 11/2006 | Desenberg | 705/37 |
|---|---|---|---|---|
| 2002/0055866 | A1 | 5/2002 | Dewar | |
| 2002/0133392 | A1* | 9/2002 | Angel et al. | 705/10 |
| 2004/0098285 | A1* | 5/2004 | Breslin et al. | 705/1 |
| 2006/0047551 | A1* | 3/2006 | Cotten et al. | 705/8 |
| 2007/0015125 | A1* | 1/2007 | Mobbs et al. | 434/219 |
| 2007/0050276 | A1* | 3/2007 | Mannion | 705/35 |
| 2008/0086366 | A1* | 4/2008 | Concordia et al. | 705/11 |

OTHER PUBLICATIONS

Declaration of Charles S. Kwalwasser.
International Search Report and Written Opinion; International Application No. PCT/US06/44425; 6 pages.

* cited by examiner

*Primary Examiner* — Kim Nguyen
(74) *Attorney, Agent, or Firm* — Morgan Lewis & Bockius LLP (57) ABSTRACT

A system and method for collecting and validating information in connection with the pre-employment process. A potential employee is presented with a plurality of questions relating to at least one of personal profile information, personal identification information, employment information, regulatory information, and policy acknowledgement information. One or more responses to the plurality of questions are received from the potential employee. The responses are stored in a database. Upon receiving the responses, at least one of (i) transmitting at least one of the responses to a third party service provider for validation; and (ii) reporting at least one of the responses to a regulatory body, an exchange or an association is automatically performed.

15 Claims, 10 Drawing Sheets

| Personal Profile | |
|---|---|
| General Information | Page 1 of 19 |
| Last Name | Pant |
| First Name | Santosh |
| Middle Initial | C |
| P&L | 4444 |
| Division | Aurora Loan Services |
| Branch/Department Name | Finance |
| Job Title | Project Engineer |
| Company | Lincoln Capital Management |
| Manager | PQR |
| Location | 3414 Peachtree Rd NE - Ste 200 |
| Country of Location | United States |
| Home Address | |
| Country * | United States ▼ |
| Street * | my street |
| Additional Address | my additional address |
| Apartment Number | my apt no |
| City * | my city |
| State/Province * | INDIANA ▼ |
| Postal Code * | 1234567 |
| Telephone Number * | 123456789 |
| Mobile Phone Number | 741258963 |
| Personal E-mail Address | |
| Have You Moved Cities in the Last Six Months ? * | ○ Yes  ⊙ No Click to Enter |
| | Previous  Save  Next |

*Required Field

FIG. 3

| Personal Identification | |
|---|---|
| Invitation to Disabled Individuals and Veterans | Page 6 of 19 |

. . .

To be considered under our affirmative action program, please complete the section below. Employees may request to see a copy of the affirmative action plans during regular business hours by contacting the Manager, EEO & Affirmative Action at (212) 526-7989.

| | | |
|---|---|---|
| **I would like to be included under the Affirmative Action Program *** | ○ Yes | ● No |
| Disabled Individual | ○ Yes | No |
| Special Disabled Veteran | ○ Yes | No |
| Veteran of the Vietnam Era | ○ Yes | No |
| Veteran of Other Wars | ○ Yes | No |

[Previous] [Save] [Next]

*Required Field

FIG. 4

| Employment and Regulatory Questionnaire | |
|---|---|
| Application Questions | Page 9 of 19* |
| Are you either a U.S. citizen or an alien legally authorized to work in the U.S. ? If you answer "yes" and are offered | ◉ Yes    ○ No |
| Microsoft Internal Explorer<br>⚠ In addition to a detailed written explanation, you will need to provide a deposition statement at your pre-employment visit.<br>[ OK ] | ◉ Yes    ○ No |
| Have you ever been suspended, expelled or otherwise disciplined or penalized by any federal, state or foreign financial regulatory body or by any financial self-regulatory organization, exchange or association, or been denied membership therein or ever withdrawn your application to such membership?* | ◉ Yes    ○ No |
| Have you been associated with any broker-dealer, as a director, investment advisor, controlling stockholder, partner, officer, employee or registered association, or was refused | ◉ Yes    ○ No |

FIG. 5

Policy Acknowledgements/Releases

Guide to Working at Lehman Brothers

Page 14 of 19

I hearby acknowledge receipt of the Guide to Working at Lehman Brothers. I accept responsibility for reviewing the material contained in this guide.

I further understand that this guide supercedes any and all previous handbooks issued by Lehman Brothers, Inc., its predecessors, affiliates and subsidiaries.

I Accept *  ☑

Previous   Save   Next

METHOD AND SYSTEM FOR CONDUCTING PRE-EMPLOYMENT PROCESS

FIELD OF THE INVENTION

The present invention relates to conducting the pre-employment process of gathering and validating information provided by potential employees.

BACKGROUND OF THE INVENTION

Virtually all companies require that potential new employee provide some level of information about themselves in connection with the pre-employment process. Certain companies, however, are highly regulated (e.g., financial services companies) and thus require a great deal of information from their potential new employee. Much of this information must be validated by and/or reported to sources outside the company. This process is cumbersome and time consuming, both to the potential new employee and to the company that seeks to employ him. Thus, there exists a need for a method and system for accurately gathering all the information required of potential new employee, and validating such information to the extent necessary, in a timely and cost efficient manner. In addition, it would be very helpful if the information provided by the potential new employee during the hiring process could be used, after hiring, in the systems of the company that require such information.

SUMMARY OF THE INVENTION

The present invention is directed to a system and method for collecting and validating information in connection with the pre-employment process. A potential employee is presented with a plurality of questions relating to at least one of personal profile information, personal identification information, employment information, regulatory information, and policy acknowledgement information. One or more responses to the plurality of questions are received from the potential employee. The responses are stored in a database. Upon receiving the responses, at least one of (i) transmitting at least one of the responses to a third party service provider for validation; and (ii) reporting at least one of the responses to a regulatory body, an exchange or an association is automatically performed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Figure 1A:
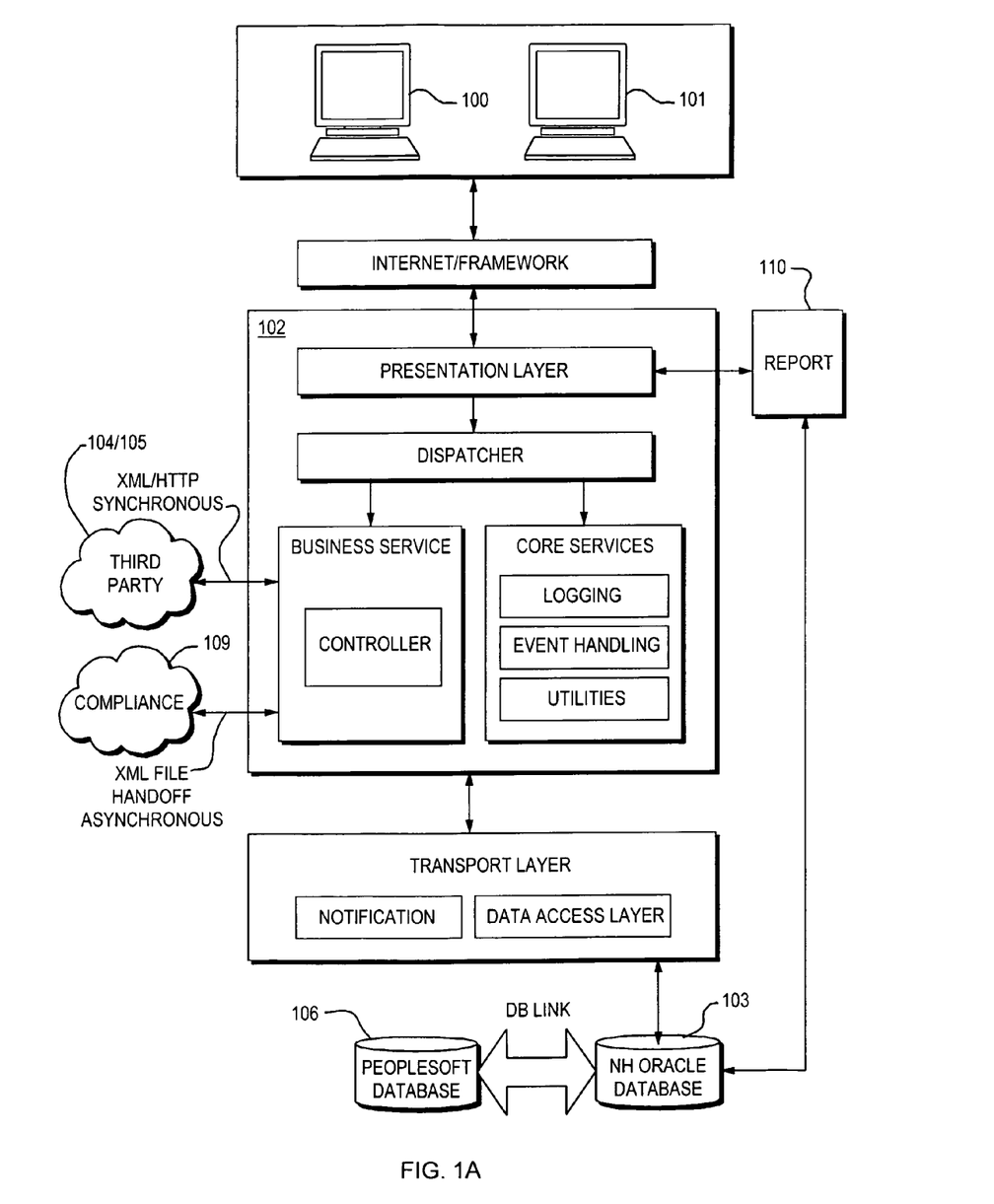
FIGS. 1A and 1B illustrate an exemplary logical overview of a system in accordance with a preferred embodiment of the present invention.

The present invention facilitates the collection of information in connection with the pre-employment process. FIG. 1A illustrates an exemplary logical overview of a system that may be used in connection with carrying out the present invention. Clients 100 and 101 communicate with the system 102 over a communications network, such as a WAN (e.g., the Internet), using a framework hosted by the company, in the preferred embodiment. Client 100 is used by a potential new employee, which when used in conjunction with a user module of system 102 provides access to the inventive system, thereby allowing the potential new employee to access forms and policies. Client 101 is used by an administrative employee of the company, which when used in conjunction with an administrative module of system 102 provides access to the inventive system, thereby allowing the administrative employee to complete a potential new employee's hiring process, view data entered by the potential new employee, print forms, and view reports. Data received by the system 102 may be stored in database 103, and subsequently provided to database 106 (e.g., a database dedicated to storing human resources data for employees of the company). System 102 also communicates with third party service providers 104 and regulatory bodies/exchanges/associations 105 (i.e., entities other than the company). Reports module 110 is used as the reporting interface to the present invention. Such reports may include forms that require the signature of the potential new employee or reports for the administration of the company.

Figure 1B:
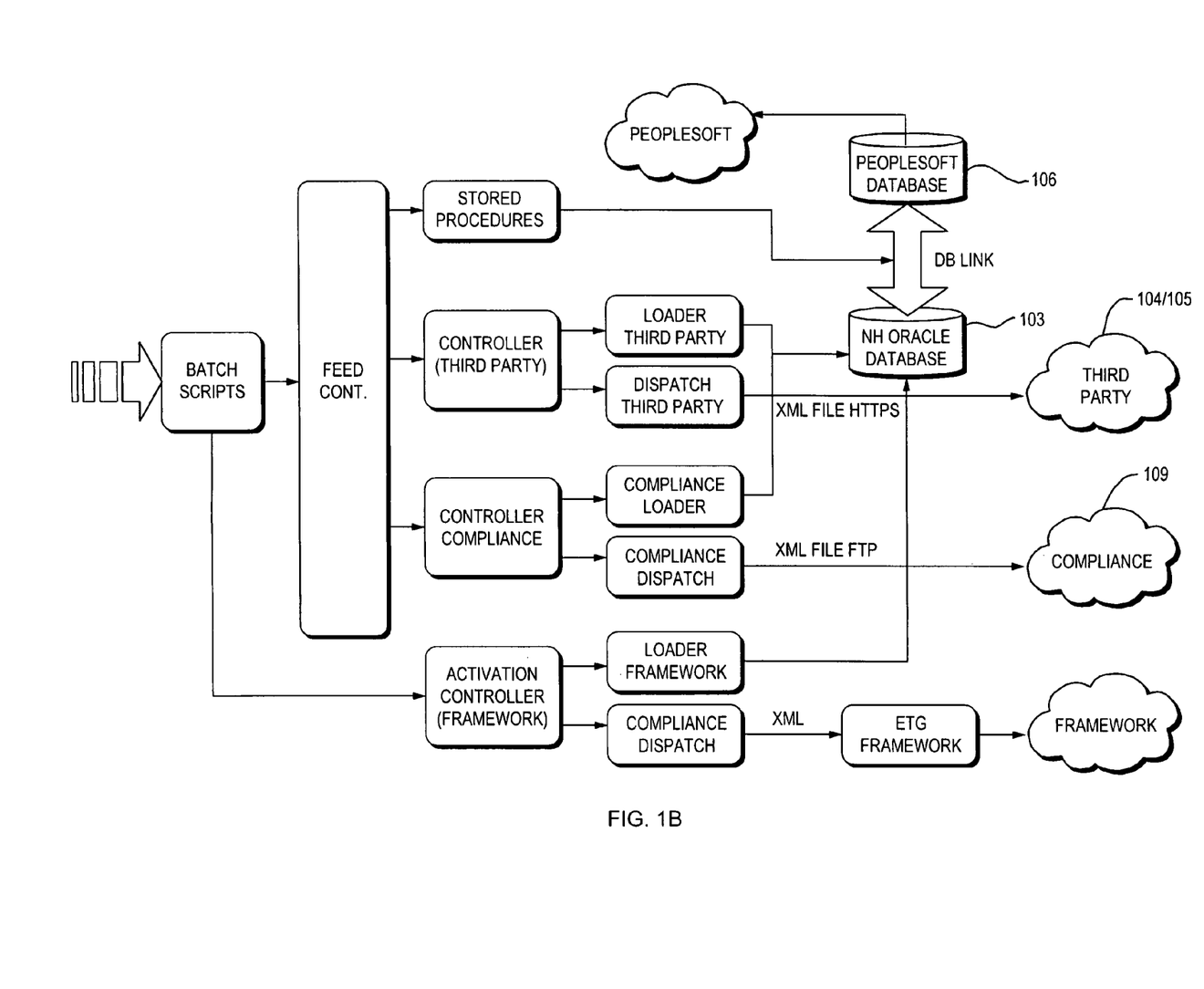
Figure 2A:
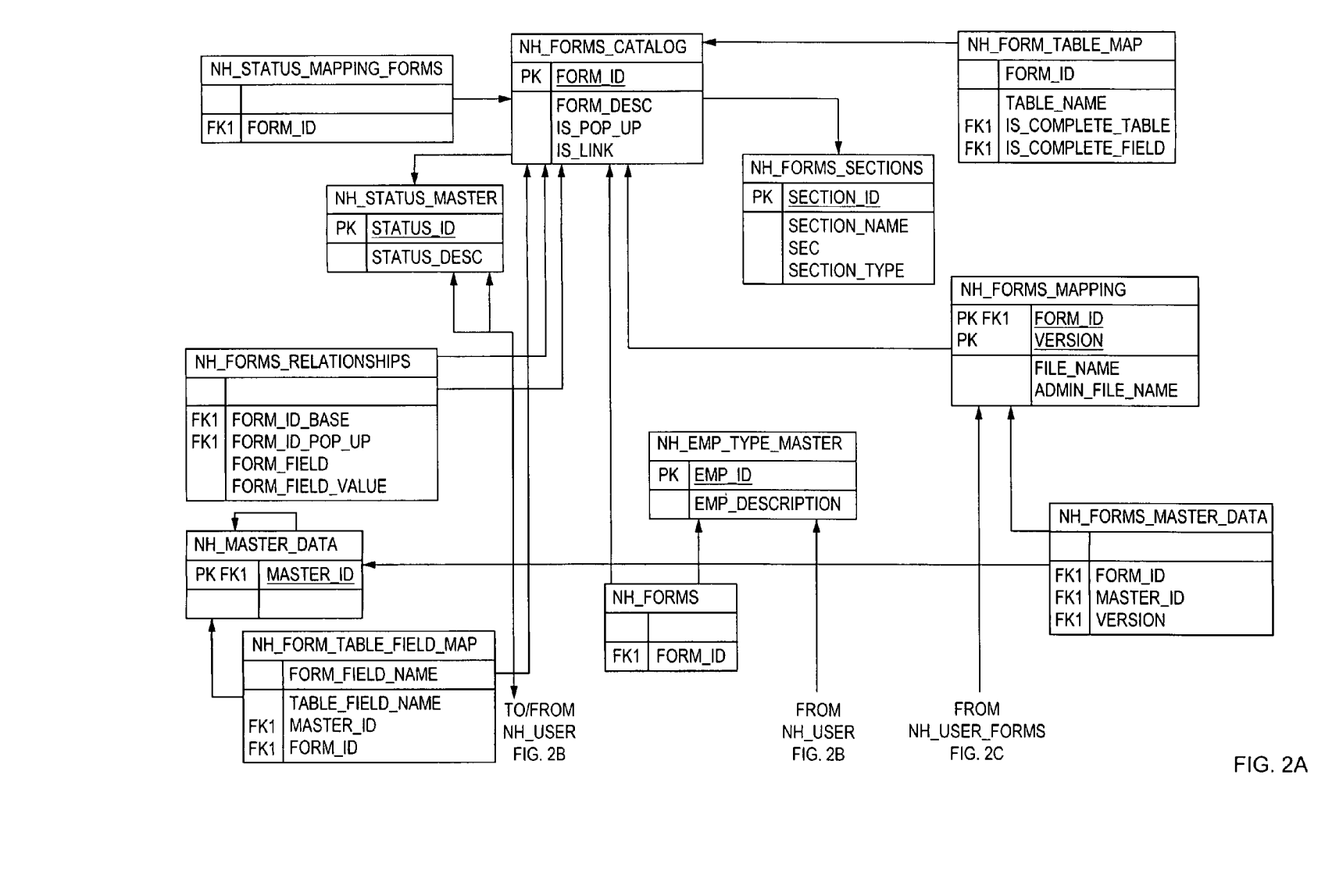
FIG. 2 is an exemplary database schema that may be used in accordance with a preferred embodiment of the present invention.
Figure 2B:
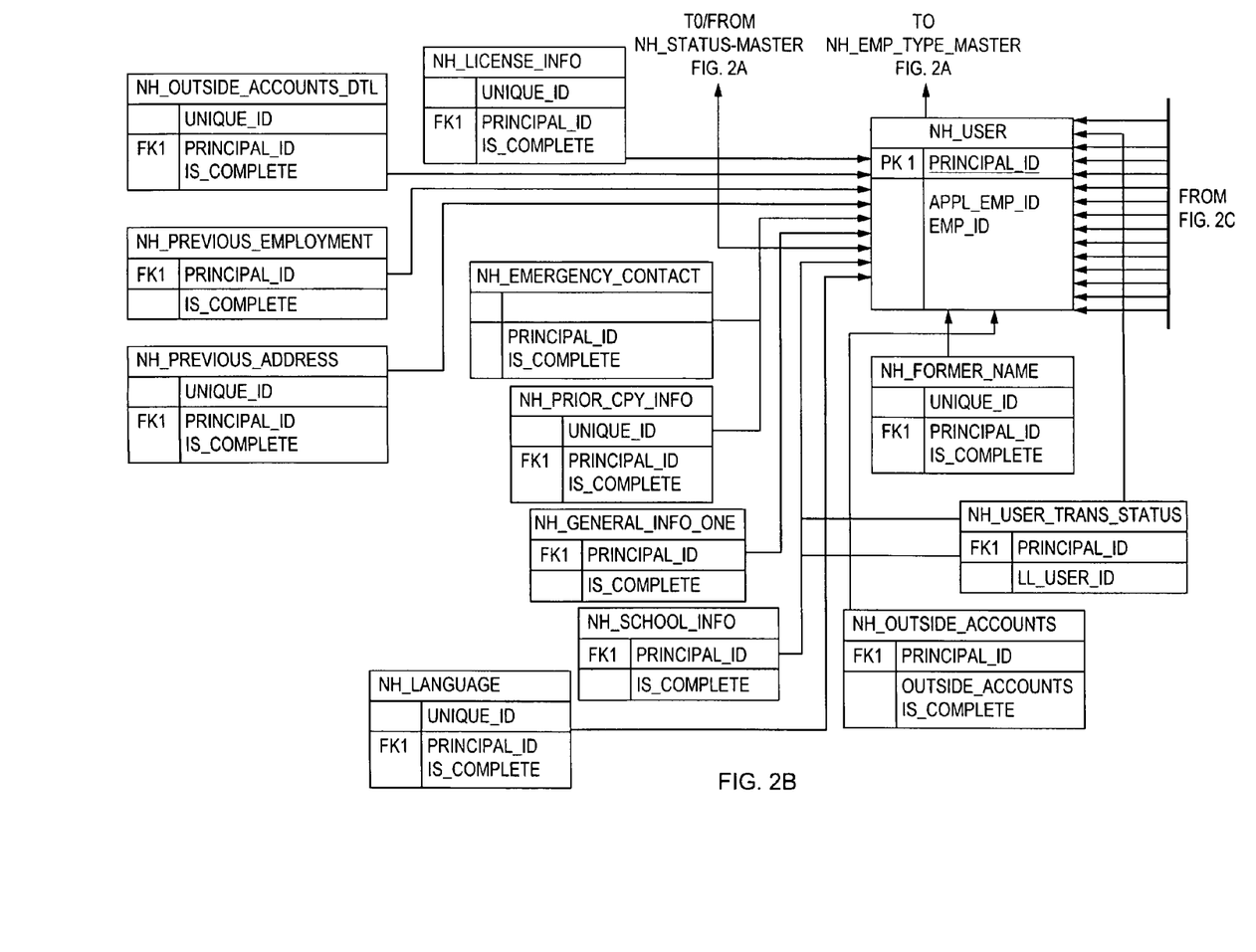
Figure 2C:
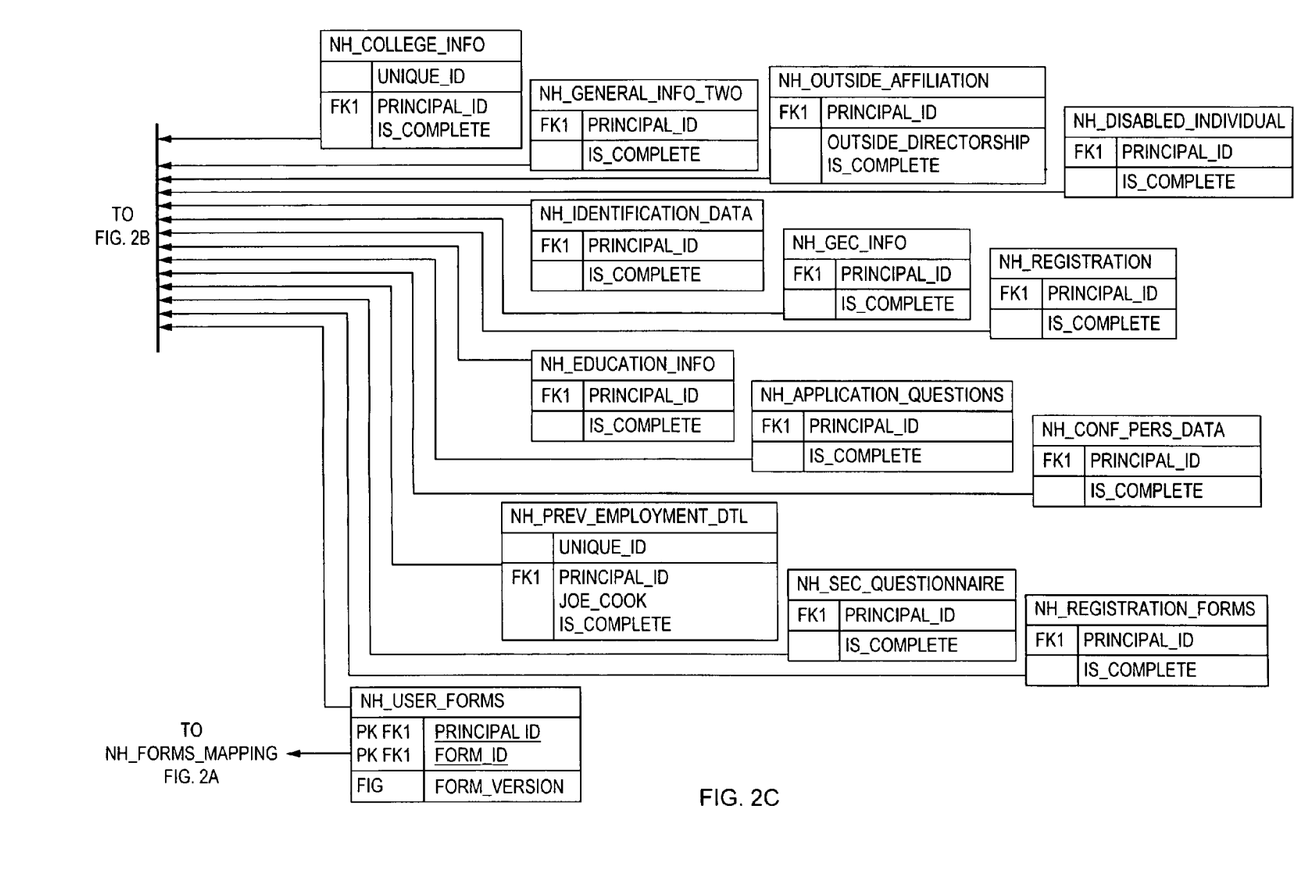
Figure 3:
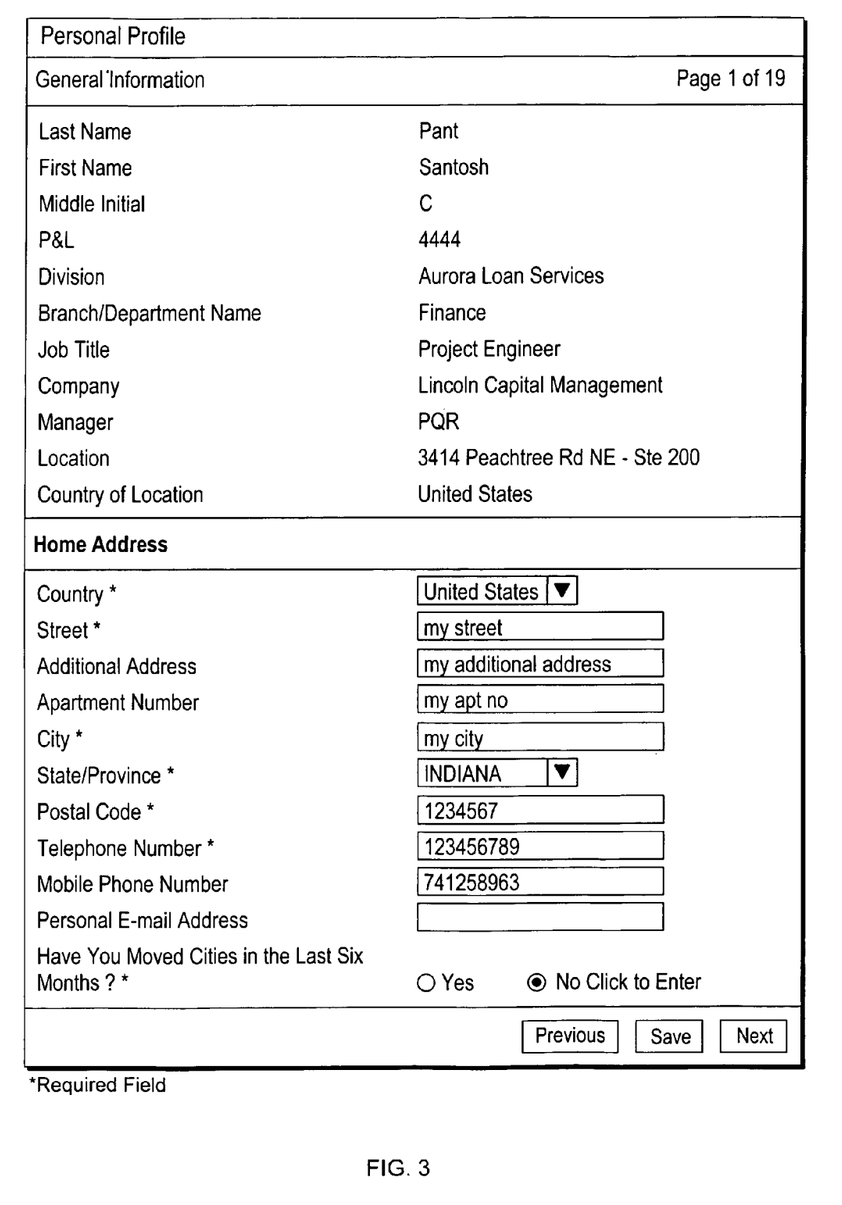
FIG. 3 is an exemplary user interface screen that may be used in accordance with a preferred embodiment of the present invention.
Figure 4:
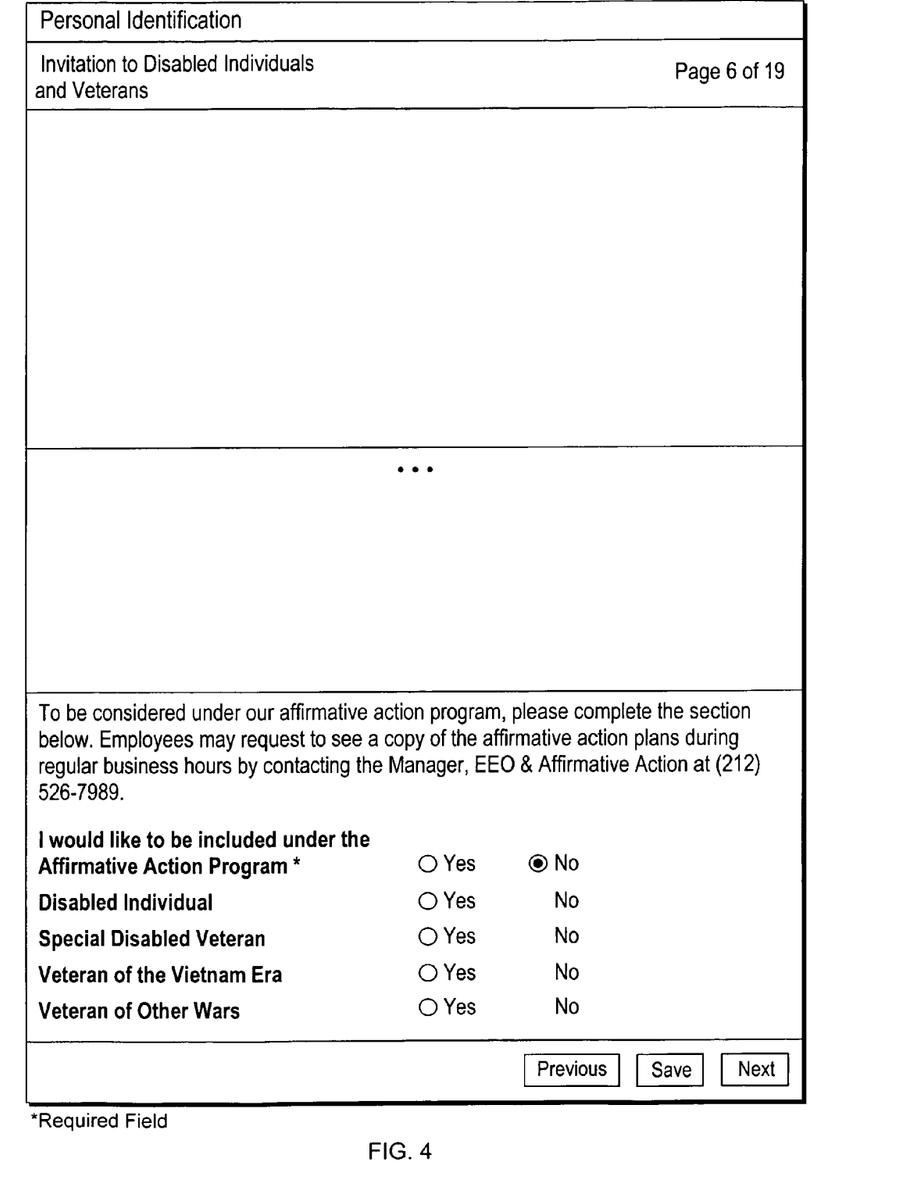
FIG. 4 is an exemplary user interface screen that may be used in accordance with a preferred embodiment of the present invention.
Figure 5:
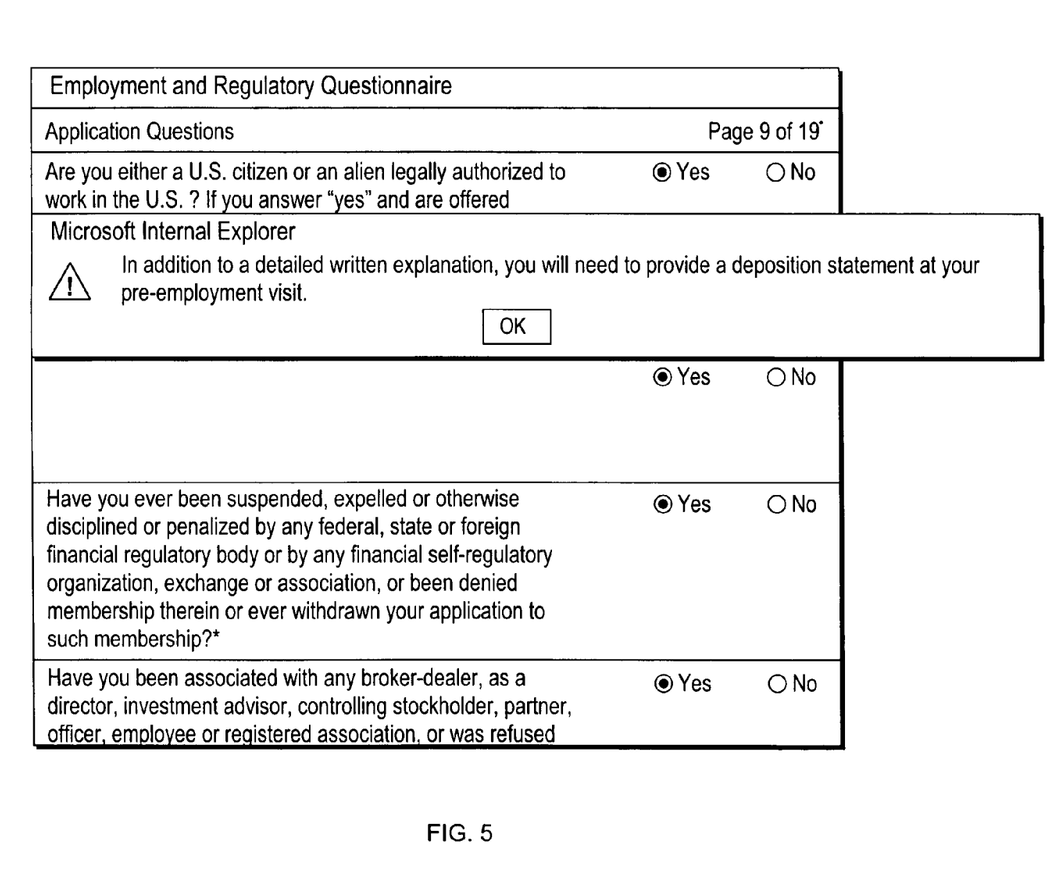
FIG. 5 is an exemplary user interface screen that may be used in accordance with a preferred embodiment of the present invention.
Figure 6:
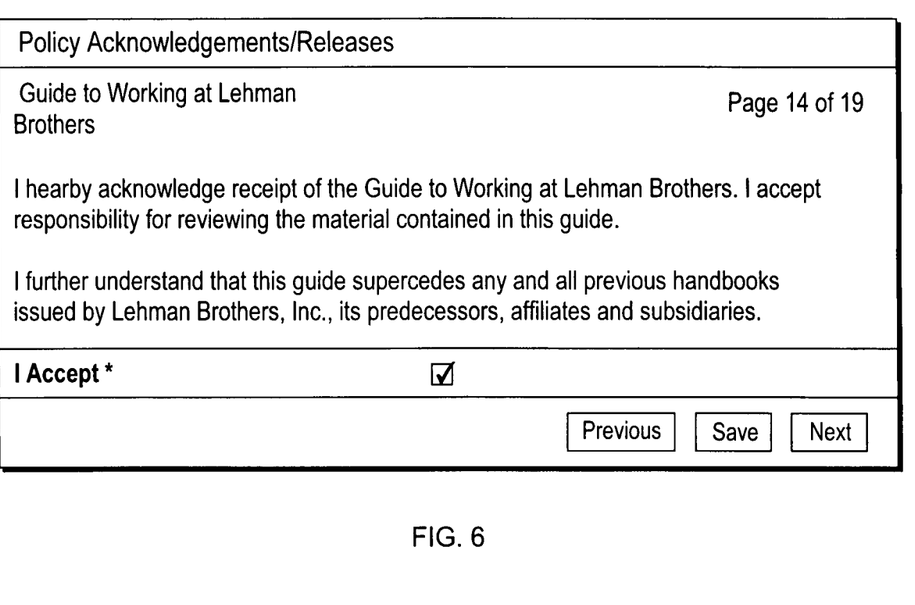
FIG. 6 is an exemplary user interface screen that may be used in accordance with a preferred embodiment of the present invention.

FIG. 2 is a database schema for database 103, illustrating an example of the way in which data collected in connection with the present invention may be stored. The various data feeds used in connection with the present invention are described as follows, with reference to FIG. 1B. A potential new employee's application is triggered when the administrator of the human resources database 106 changes his applicant status in the database 106 to "ready to hire". The database 106 triggers a procedure which sends the potential new employee information to the database 103 over a DB Link. For first time hires, the database 106 is polled hourly to determine if an applicant has been hired and if so, passes the employee identification and hire date to database 106. For rehires, when the employee is "rehired" in database 106, a feed is triggered which updates database 103 with the re-hire date.

When the administrator "completes" the potential new employee in the system, a feed is generated from the system 102 to the database 106. A set of stored procedures on the database 103 send the data over the DB link to the database 106. An applicant is said to be "complete" once he has been hired in database 106 and has been cleared to hire by the staffing department. On completion, a feed to compliance 109 is triggered. An xml message is created using an xml template and the data from the database 103. On completion, another feed to the third party service providers 104 and regulatory bodies/associations 105 is triggered. An xml message is created using an xml template and the data from the database. This xml message is sent to third party service providers 104 and regulatory bodies/associations 105 over an https connection.

The following example illustrates one way in which the present invention can be implemented. A potential new employee communicates to the company/potential employer a desire to become employed by the company. A human resources representative within the company enters basic information regarding the potential new employee into a database 106, thereby creating an applicant record. The status of the record is defaulted to "inactive". Upon activating the record, a message (e.g., an electronic mail message) is created and sent to the potential new employee by system 102, and received by the potential new employee at client 101. In other embodiments, the message can be sent by conventional means (e.g., via the postal service) or communicated to the potential new employee in person or over the telephone. The message provides the potential new employee with a user identification number, a password, and a hyperlink (or identification of an internet address) to a website that will allow the potential new employee to utilize the system of the present invention.

Using client 101, the potential new employee navigates to the website indicated in the message to commence the pre-employment process. Upon entering the potential new employee's identification number and password, the potential new employee is presented with a series of screens. The screens walk the potential new employee through the pre-employment process and, in particular, present to the potential new employee a series of questions, the answers to which are required by the company in order to consider hiring a new employee. The information requested from the potential new employee may include personal profile information (general information, emergency contact information, education/language information, and prior employment information); personal identification information (disabled and veteran status, race and ethnicity); employment and regulatory information (registration information, SEC questionnaire, outside account identification, outside affiliation identification); and policy acknowledgements and releases (e.g., acknowledgment of employee guides and handbooks, confidentiality agreement, consent to jurisdiction, intellectual property assignment agreement, authorization for background investigations, application for employment, and consent for drug analysis). The information provided by the employee by way of this process may be stored in database 106 and fed into other systems within the company that require it, thus providing timely and accurate employee data to such systems.

In the preferred embodiment, the basic forms provided to the potential new employee (apart from the pop-up screen functionality described below) are determined by pre-populated data regarding the potential new employee previously inputted by, e.g., human resources personnel. For example, such data items may include the region, business unit, and employee type (regular or campus). Exemplary screens, showing questions regarding personal profile information, personal identification information, employment and regulatory information, and policy acknowledgements and releases are shown in FIGS. 3, 4, 5 and 6, respectively.

In certain embodiments, the questions and requests for information presented to the potential new employee are tailored based on the potential new employee's identity, where the potential new employee resides, and/or the response provided by the potential new employee to a particular question presented, thereby allowing the potential new employee to provide additional information for a particular line of questioning. Thus, for example, if the potential new employee is from California, an authorization for drug analysis is not presented for completion by the potential new employee. By way of further example, if the potential new employee enters "yes" to the question as to whether he has a degree beyond high school, a screen will be presented asking that he select a school.

To the extent the pre-employment process requires that the potential new employee complete a form that requires a physical signature, the potential new employee can print out the form using the system and submit it to the company in a conventional manner.

Upon entering the requested information and indicating an intent to submit such information to the employer, the data representing such information is transmitted over the network to the system 102. Databases 103/106 are populated with this data. Such databases may include those dedicated to storing human resources related data and compliance data, such as database 106. In addition, certain information may be automatically transmitted by the system 102 to third party service providers 104 or regulatory bodies/exchanges/associations 105. In such embodiments, fields within the database 103 are tagged, indicating which data is to be provided to the third party service provider 104 or regulatory body/exchange/association 105. Further, the database 103 includes a "status" field, which when tagged as "completed" indicates that the data is ready to be sent to the third party service provider 104 or regulatory body/exchange/association 105. Once the data has been collected and successfully sent to the third party service provider 104 or regulatory body/exchange/association 105, a "sent" field is marked to ensure the data is not sent twice. The third party service providers 104 assist in validating the information submitted by the potential new employee. For example, the third party service provider 104 may conduct a background check regarding the potential new employee. By way of further example, certain financial services companies are required to provide data regarding new employees to certain regulatory bodies, exchanges and associations 105 (e.g., the Securities Exchange Commission, the New York Stock Exchange, and the National Association of Securities Dealers). In one embodiment, the forms are versioned such that a potential new employee is always presented with the same set of forms with which he was presented when he first accessed the system, irrespective of whether the forms subsequently change. When the potential new employee first logs in, the system takes a snapshot of all the forms the potential new employee should see based on, e.g., location and employee type, and stores it in the database along with the latest version number of that form. Because the forms and the content of the forms change frequently, the queries to fetch data and save data are dynamically generated. Each form is mapped to a table one to one or many to one. The form to table mapping is stored in the database 103, as is the form field to the table field mapping. This data is used to create the queries at runtime. The final submit and checking required fields logic is also made to be database driven. As the number of forms and the forms themselves may be different for different potential new employees, the required field logic is dynamic to suit this variation. The system is structured in such a way that various components and APIs provide the functionality needed for the smooth functioning of the versioning and the configuration of forms. The various components and APIs are described below.

The API used to determine user forms identifies the forms that a potential new employee should see when he first logs into the system. When the potential new employee logs into the system, after checking his userid, the system determines the principal id for that person. Thereafter, the system calls this API, which queries the database 103 (NH_FORMS) and obtains the list of forms the potential new employee should see, irrespective of the status. The API also determines the latest version of these forms. It updates the NH_USER_FORMS table with the list of form along with versions a potential new hire should see throughout his lifetime.

The API used to update the current status forms in the session reads the forms that the potential new employee should see for the current status from the NH_USER_FORMS table and updates the session. This API is called whenever the potential new hire logs onto the system and also when the status changes.

The API used to render left navigation creates the Left Navigation based on the forms the potential new hire should see. It takes from the session the forms (NH_FORMS_CATALOG) belonging to the sections (NH_FORM_SECTION) having the section type as "LEFT". This API generates the html code along with the links and sequence. This API will be invoked from the front end Left Nav jsp to add the left nav to each page.

The API used to render right navigation creates the Right Navigation based on the forms the potential new hire should see. It takes from the session the forms (NH_FORMS_CATALOG) belonging to the sections (NH_FORM_SECTION) having the section type as "RIGHT". This API generates the html code along with the links and sequence. This API will be invoked from the front end Right Nav jsp to add the right nav to each page.

The API to determine the next sequential page and the previous sequential page determines the form id, form name and the physical form file name for the next/previous sequential form that the potential new hire should see. This is required to determine what will be the target page for the Next and Previous buttons.

The API to get the master data for the target form obtains the master data (NH_FORMS_MASTER_DATA) for the target form from the cache. If the master data does not exist in the cache, it runs the code to cache the data and then obtains it from the cache. If that caching fails, then it obtains it directly from the database.

The API to render the print form page creates the Print Form Page based on the report forms the potential new employee should see. It takes from the session the forms (NH_FORMS_CATALOG) belonging to the sections (NH_FORM_SECTION) having the section type as "REPORT". This API generates the html code along with the links and sequence. This API will be invoked from the Report.jsp.

The component to load master data and other form related data in cache is executed on server startup and caches all the results of the SQL queries from the NH_MASTER_DATA table. It also caches other frequently used data, such as table to form mapping and table field to form field mapping. The master data may need to be reloaded during the server runtime. StartupServlet jsp in the NHADMIN folder when invoked on each managed server will achieve the task of reloading the cache with all the cached data.

With regard to the API to determine the Pop Up page for the base page, some fields in the base page (jsps loaded in the same window) bring up a pop up (new window) when a particular value is selected. Upon this mapping of the field, the pop up page it brings up and the value at which the pop up is enabled is stored in the NH_FORMS_RELATIONSHIPS table. With regard to the API to handle delete of pop up data, when the value of the pop up field on the base page is toggled to any value other than the one stored in the NH_FORMS_RELATIONSHIPS table, then on click of save/previous/next button, the data in the pop up page table is to be deleted. Thus, an API is called at every action, which checks if any pop up page is associated with the base page and, if yes, deletes the data if the value for that field does not match with that stored in the NH_FORMS_RELATIONSHIPS table.

The API to get the table name for a form name and vice versa returns the table name mapped to a given form. This is required while dynamically creating the update/insert or select query. The form for which the data is to be inserted/updated (srcPage) will be known. The form for which the data is to be fetched (targetPage) will also be known. The query will be generated by first fetching the table names corresponding to this form.

The API to get the table field names for the form field names and vice versa returns the table field names for the given form fields for the given form and vice versa. This, again, is required to dynamically build the query as mentioned above.

With regard to the API to handle the final submit, in the final submit of the application, it must be determined if all of the required field are complete. Each form jsp checks for the required fields in an individual form and sets the IS_COMPLETE flag to Y or N, as the case may be. During final submit, all these flags are checked to determine which forms were not complete. Then, the potential new employee is directed to a page which lists the form as incomplete and the links on the left nav is reddened. Also, when the incomplete jsp is rendered, the jsps checks the value of the required fields and if it is null or blank, it reddens the field.

With regard to the API to handle special logic, because the code for reading data for a particular jsp and saving data for the other jsp is pretty standard and reused, there is little scope for any special rules. Thus, the concept of special logic API is added. The idesk request object with all the request data is passed to this method executeSrcPageExceptionMethod in the NewHireExceptionalMethods class. This method checks as to whether any EXCEPTION_METHOD_SRC_PAGE exists in NH_FORMS_CATALOG. If yes, this method invokes the EXCEPTION_METHOD_SRC_PAGE method using reflection. This method takes the IDeskRequestObject and processes it and returns an IDeskRequestObject again.

While getting data for the Target page, the executeTrgPageExceptionMethod in NewHireExceptionalMethods class checks whether the EXCEPTION_METHOD_TRG_PAGE exists in the NH_FORMS_CATALOG. If yes, this method is invokes EXCEPTION_METHOD_TRG_PAGE method. This method takes the IDeskResponseObject and processes it and returns the IDeskResponseObject.

Figure 7:
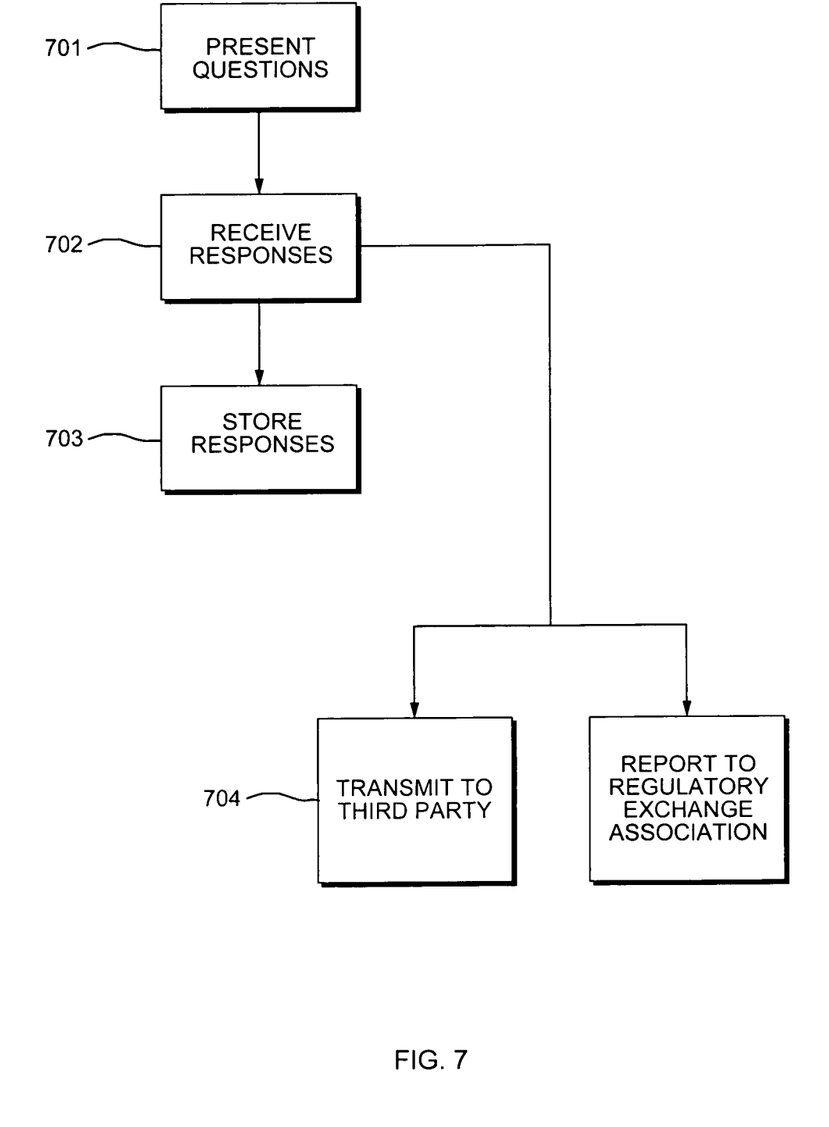
FIG. 7 is a flow chart illustrating an exemplary method of the present invention.

A flow chart, illustrating a preferred embodiment of a method for collecting and validating information in connection with the pre-employment process, is shown in FIG. 7. In step 701, a potential employee is presented with a plurality of questions relating to at least one of personal profile information, personal identification information, employment information, regulatory information, and policy acknowledgement information. In step 702, one or more responses to the plurality of questions are received from the potential employee. In step 703, the responses are stored in a database. In step 704, upon receiving the responses, at least one of (i) transmitting at least one of the responses to a third party service provider for validation; and (ii) reporting at least one of the responses to a regulatory body, exchange or association is automatically performed. One or more of these steps may be performed by software running on a computer processing apparatus.

What is claimed is:

1. A computer implemented method comprising:
   (A) presenting to a potential employee of a potential employer, via a computer, a plurality of questions relating to at least one of personal profile information, personal identification information, employment information, regulatory information, and policy acknowledgement information;
   (B) receiving from the potential employee, via a computer, one or more responses to the plurality of questions;
   (C) storing the responses in a database; and
   (D) upon receiving the responses, automatically transmitting at least one of the responses, via a computer, to a third party service provider to confirm accuracy of the at least one of the responses against a third party data source, the third party service provider being an entity other than the potential employer.

2. The computer implemented method of claim 1 wherein the questions presented to the potential employee are automatically selected, via a computer, based on at least one of an identity of the potential employee, a location of the potential employee, or a response by the potential employee to a previously presented question.

3. A system comprising:
   memory operable to store computer executable instructions; and
   at least one processor communicatively coupled to the memory, in which the computer executable instructions, when executed by the at least one processor, cause the at least one processor to:
      present to a potential employee, of a potential employer, a plurality of questions relating to at least one of personal profile information, personal identification information, employment information, regulatory information, and policy acknowledgement information;
      receive from the potential employee one or more responses to the plurality of questions;
      upon receiving the responses, automatically
         transmit at least one of the responses to a third party service provider to confirm accuracy of the at least one of the responses against a third party data source, the third party service provider being an entity other than the potential employer; and
      store the responses in a database communicatively coupled to said at least one processor and said memory.

4. The system of claim 3 wherein the at least one processor is further caused to automatically select the questions presented to the potential employee based on at least one of an identity of the potential employee, a location of the potential employee, or a response by the potential employee to a previously presented question.

5. A non-transitory computer-readable medium comprising instructions which, when executed by a processor, perform a method comprising:
   (A) presenting to a potential employee of a potential employer, via a computer, a plurality of questions relating to at least one of personal profile information, personal identification information, employment information, regulatory information, and policy acknowledgement information;
   (B) receiving from the potential employee, via a computer, one or more responses to the plurality of questions;
   (C) storing the responses in a database; and
   (D) upon receiving the responses, automatically transmitting at least one of the responses, via a computer, to a third party service provider to confirm accuracy of the at least one of the responses against a third party data source, the third party service provider being an entity other than the potential employer.

6. The non-transitory computer-readable medium of claim 5 wherein the questions presented to the potential employee are automatically selected, via a computer, based on at least one of an identity of the potential employee, a location of the potential employee, or a response by the potential employee to a previously presented question.

7. A computer implemented method comprising:
   (A) presenting to a potential employee of a potential employer, via a computer, a plurality of questions relating to at least one of personal profile information, personal identification information, employment information, regulatory information, and policy acknowledgement information;
   (B) receiving from the potential employee, via a computer, one or more responses to the plurality of questions;
   (C) storing the responses in a database; and
   (D) upon receiving the responses, automatically reporting at least one of the responses, via a computer, to a regulatory body, an exchange or an association responsible for licensing or regulating the potential employee.

8. The computer implemented method of claim 7 wherein the questions presented to the potential employee are automatically selected, via a computer, based on at least one of an identity of the potential employee, a location of the potential employee, or a response by the potential employee to a previously presented question.

9. A system comprising:
   memory operable to store computer executable instructions; and
   at least one processor communicatively coupled to the memory, in which the computer executable instructions, when executed by the at least one processor, cause the at least one processor to:
      present to a potential employee of a potential employer a plurality of questions relating to at least one of personal profile information, personal identification information, employment information, regulatory information, and policy acknowledgement information;
      receive from the potential employee one or more responses to the plurality of questions;
      upon receiving the responses, automatically report at least one of the responses to a regulatory body, an exchange or an association responsible for licensing or regulating the potential employee; and
      store the responses in a database communicatively coupled to said at least one processor and said memory.

10. The system of claim 9 wherein the at least one processor is further caused to automatically select the questions presented to the potential employee based on at least one of an identity of the potential employee, a location of the potential employee, or a response by the potential employee to a previously presented question.

11. A non-transitory computer-readable medium comprising instructions which, when executed by a processor, perform a method comprising:

(A) presenting to a potential employee of a potential employer, via a computer, a plurality of questions relating to at least one of personal profile information, personal identification information, employment information, regulatory information, and policy acknowledgement information;
(B) receiving from the potential employee, via a computer, one or more responses to the plurality of questions;
(C) storing the responses in a database; and
(D) upon receiving the responses, automatically reporting, via a computer, at least one of the responses to a regulatory body, an exchange or an association responsible for licensing or regulating the potential employee.

12. The non-transitory computer-readable medium of claim 11 wherein the questions presented to the potential employee are automatically selected, via a computer, based on at least one of an identity of the potential employee, a location of the potential employee, or a response by the potential employee to a previously presented question.

13. The computer implemented method of claim 1 further comprising:
(E) upon receiving the responses, automatically reporting at least one of the responses, via a computer, to a regulatory body, an exchange or an association responsible for licensing or regulating the potential employee.

14. The system of claim 3 wherein upon receiving the responses, the at least one processor is further caused to automatically report at least one of the responses to a regulatory body, an exchange or an association responsible for licensing or regulating the potential employee.

15. The non-transitory computer-readable medium of claim 5 further comprising:
(E) upon receiving the responses, automatically reporting, via a computer, at least one of the responses to a regulatory body, an exchange or an association responsible for licensing or regulating the potential employee.

* * * * *